Dec. 24, 1968   B. G. COPPING ET AL   3,417,540
APPARATUS FOR FORMING PACKAGES OF ARTICLES BY BANDING
IN A HEAT SHRUNK PLASTIC FILM
Filed Jan. 9, 1967   7 Sheets-Sheet 1

INVENTORS
BRUCE G. COPPING
WALTER D. HARDEE
ROBERT W. MCGILL
By *Oldham & Oldham*
ATTYS.

United States Patent Office 3,417,540
Patented Dec. 24, 1968

3,417,540
APPARATUS FOR FORMING PACKAGES OF ARTICLES BY BANDING IN A HEAT SHRUNK PLASTIC FILM
Bruce G. Copping and Walter D. Hardee, Akron, and Robert W. McGill, Stow, Ohio, assignors to Geo. J. Meyer Manufacturing Co., Cudahy, Wis.
Filed Jan. 9, 1967, Ser. No. 608,116
13 Claims. (Cl. 53—48)

ABSTRACT OF THE DISCLOSURE

This apparatus processes articles that are fed along in one or more continuous streams of abutted articles enclosed in a band of plastic film. Members engage certain of the articles and separate them into longitudinally spaced groups of articles while cutter means of a flying shear type are provided to sever the film into sections intermediate the longitudinally spaced article groups. Members engage opposed top and bottom portions of the grouped articles and film thereon when a heat shrink action on the film is effected to draw the film into tight engagement with the articles for completing the package, which action draws end film portions into engagement with vertical sections of end articles in the article groups.

This invention relates to the type of apparatus disclosed in Bruce G. Copping co-pending application Ser. No. 465,613, filed June 21, 1965, now Patent No. 3,381,443.

At the present time, a large number of various types of articles, and particularly beverage containers such as cylindrical cans, are sold in the form of packaged assemblies that can be readily transported, stored and sold. While quite a few of these package assemblies are made by the use of cardboard enclosure means to provide a package including, for example, four, six or eight beverage containers, there have been some efforts made in the past to form package assemblies from a plurality of articles wherein the enclosure means primarily or solely comprise a transparent heat shrunk envelope engaging the articles to retain them in tight association with each other. Naturally, large numbers of these containers are adapted to be processed automatically in the package forming machines and it naturally is desirable to run such machines at as high a rate as is possible and at the same time to provide effective assemblies of the packaged articles for retaining them in a sturdy unit assembly until it is desired to use one or more of the packaged units.

The general object of the present invention is to provide a new and improved automatic apparatus for processing a continuous abutted stream or streams of articles so as to separate such articles into longitudinally spaced groups of articles and to enclose them in a plastic film envelope which is heat shrunk into engagement with the articles, the continuous film being severed into individual sections or bands extending around the articles from top to bottom thereof and including short vertically extending end sections engaging portions of the end articles in the assembly.

Another object of the invention is to provide novel and improved chain or belt carried means for engaging articles in longitudinally moving abutted streams of articles to separate them into longitudinally spaced groups in an enclosure envelope made from a plastic film and to process the articles while retained in such groups.

A further object of the invention is to provide means usually carried by endless chain means and engaging with opposed top and bottom portions of longitudinally spaced groups of articles in a stream of articles being moved along through a fixed path of processing in accordance with the invention and wherein the apparatus is adapted to provide sufficient plastic film in association with each group of articles to engage the packaged articles including short vertically extending end portions of the end articles in a group of articles being packaged by a heat shrink banding action of the film.

The present invention also has as its object the provision of novel and improved "flying shear" type of cutter means for severing a continuous plastic band into separate sections for enclosing individual assemblies of articles in an article forming or packaging machine; to provide novel and improved heat shrink tunnels through which the packaged articles pass for drawing the plastic film into tight engagement with the packaged articles; to provide improved means for retaining a heat shrink tunnel in good operative condition while the apparatus is stopped or article movement is interrupted in any manner; and to provide new and improved apparatus for processing a number of containers for beverages such as beer, soft drinks or the like, rapidly, continuously and efficiently into a relatively inexpensive but sturdy assembly of attractive design.

The foregoing and other objects and advantages of the invention will be made more apparent as the specification proceeds.

Attention now is particularly directed to the details of the structure shown in the accompanying drawings, wherein:

FIG. 6 is an enlarged fragmentary plan view, partially broken away, of the apparatus for engaging the continuous stream of articles and separating it into longitudinally spaced groups;

FIG. 6a is a fragmentary reduced scale end elevation of the endless chain assembly and other means shown in FIG. 6;

FIG. 6b is a fragmentary side elevation taken on line 6b—6b of FIG. 6a;

When referring to corresponding members shown in the drawings and referred to in the specification, corresponding numerals are used to facilitate comparison therebetween.

Attention now is particularly directed to the details of the structure shown in the drawings, and the package forming apparatus of the invention is indicated as a whole by the numeral 10. This apparatus 10 includes any suitable type of a frame 11 and, at the leading or upstream end of the apparatus 10, conventional article supply means (not shown) are provided whereby a stream of abutted articles, such as cans 12, are supplied to the apparatus. These cans, in the embodiment of the invention shown, are divided into two streams of cans by suitable means, in this instance a pair of rotary can divider units 13, that are provided for laterally offsetting alternate cans in the stream of cans being fed to the apparatus to set up two laterally adjacent and abutted continuous streams of abutted cans moving at half of the speed of the incoming row of cans. Any suitable guide means (not shown) are provided for maintaining the cans in proper alignment as they move to the means 13 and pass into and through the apparatus. The streams of cans then flow through a film forming collar indicated as a whole by the numeral 14. This collar is adapted to take a sheet of plastic film 15 from a supply means, such as a roll 150, and fold the film progressively and continuously into an enclosure collar or band that extends around the rows of cans from top to bottom thereof. As the cans and film move through the film forming collar means 14, the film normally is overlapped at the bottom portion of the can and film assembly and suitable means (not shown) are provided to engage this film and can assembly continuously as the film moves through the apparatus for providing a heat seal action, normally, between the adjacent and overlapped edges of the film. Such film band moves continuously with the articles as the package of the invention is being formed in further processing in the apparatus hereinafter described. Normally at this time, the film is still loosely associated with the cans which can be supported on any suitable support means as they are pushed into and through the apparatus by the feed of incoming cans to the upstream end of the apparatus 10.

*Article group forming*

Figures 6, 6A, 6B:
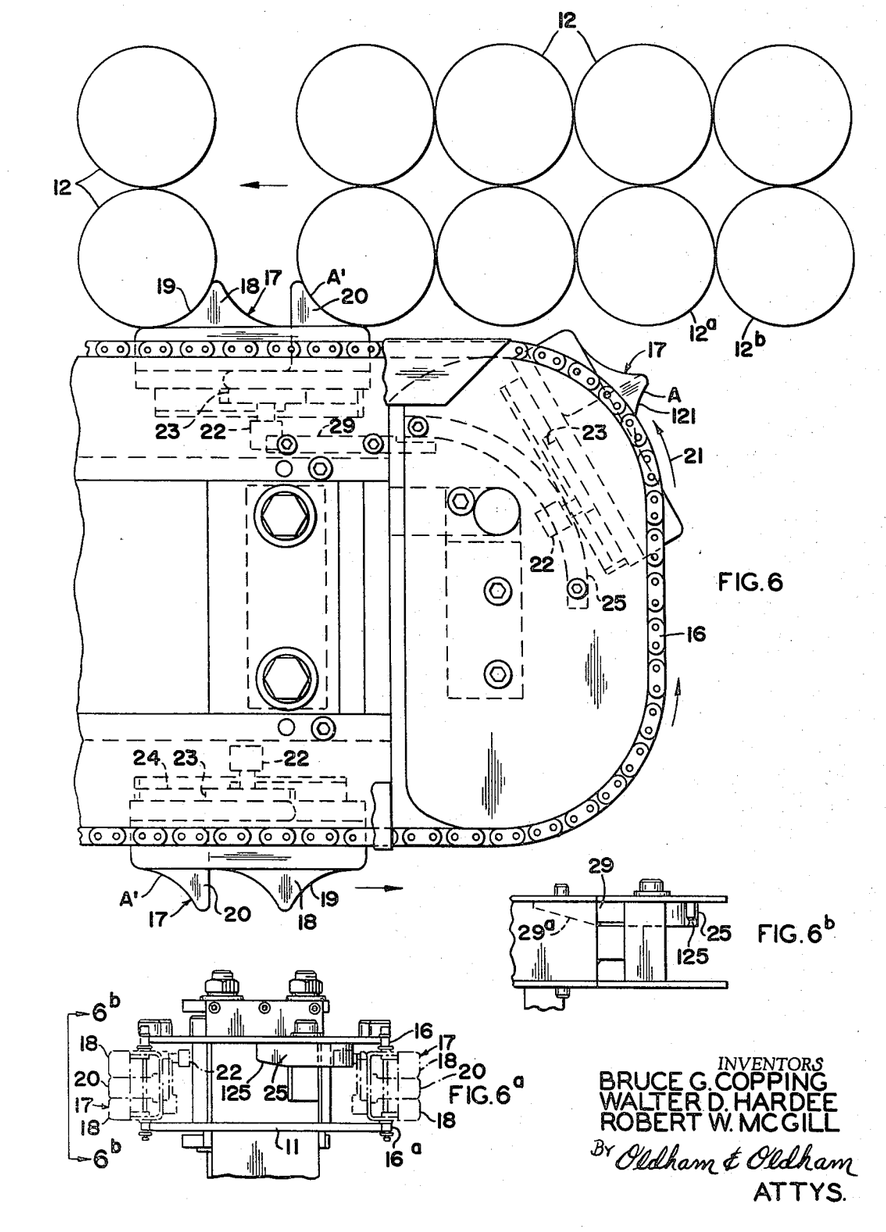
Figure 7:
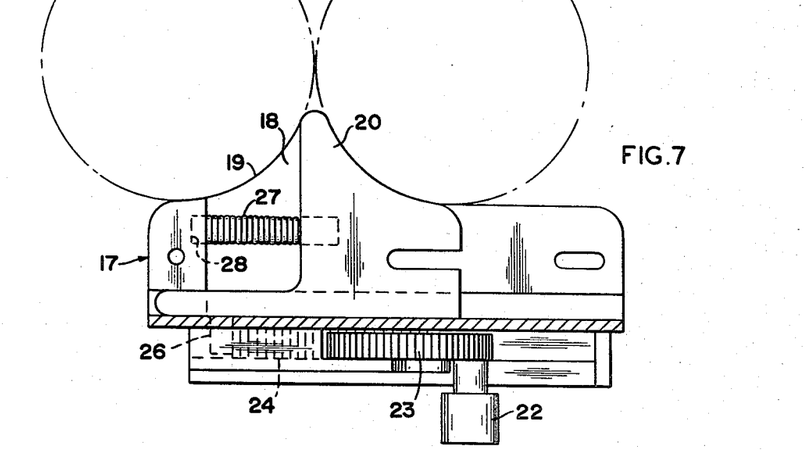
FIG. 7 is an enlarged fragmentary plan of one of the article engaging units shown in its cocked position when initially engaging the stream of articles.
Figure 8:
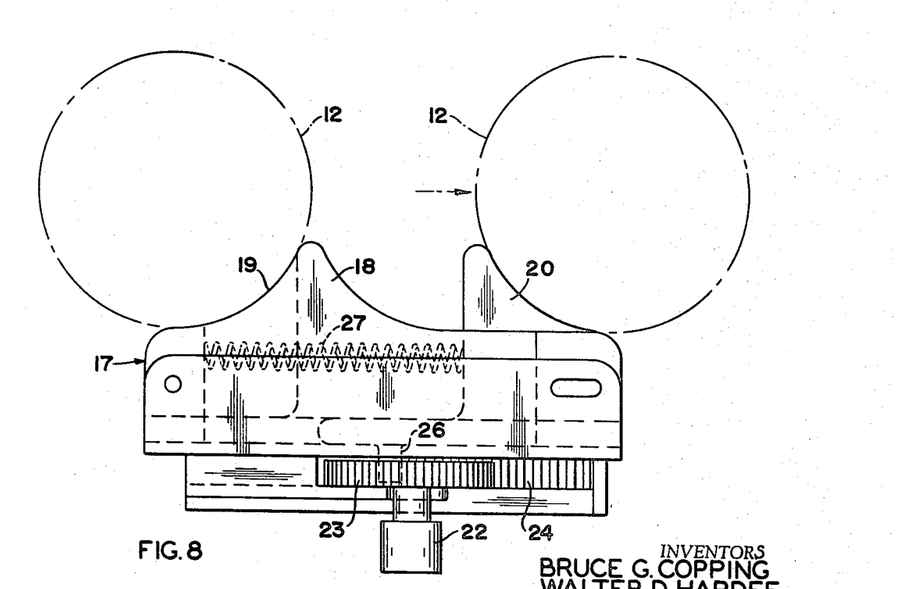
FIG. 8 is a plan view similar to FIG. 7, but with part of the apparatus having been released from its cocked position and to provide a separation between two initially adjacent and abutted articles.

FIGS. 6, 7 and 8 best show in enlarged detail certain parts of the apparatus of the invention for separating the abutted cans, or other articles 12 into longitudinally spaced groups of articles for processing in the apparatus. To provide this action, a pair of endless, driven, bands, or chain means 16, 16 are provided and are positioned, normally, in a horizontal plane with an inner and an outer course in each of the endless chains with the inner course of each chain being positioned immediately adjacent the lateral margins of the rows of the cans 12. The chains 16 move the cans downstream through a fixed path. These driven chains 16 each have a plurality of article engaging and separating means 17 suitably secured thereto at uniformly spaced longitudinal portions of the chains. Such article separating means 17 are all of the same construction and are, in effect, positioned on vertical operative axes by the endless chains 16 and protrude inwardly from the inner courses thereof in opposed relation. The chains are positioned in the apparatus 10 on the fame 11 in any conventional manner.

As best shown in FIG. 6, each of the article separator means 17 includes a finger 18 which is part of the frame of the article separating means 17, or is immovably carried thereby and has at least one surface 19 thereon of a contour complementary to a surface of one of the cans 12, in this instance, the trailing surface thereof. Such finger 18 will engage the trailing can in a group of articles formed in the apparatus as hereinafter explained. A movably positioned member, or finger 20 is also provided in each one of the article separating means 17 at the upstream portion thereof on the inner course of movement of the chain. Each of such fingers has an arcuate surface 121 thereon that is complementary to the leading surface of the cans 12. When the movable finger is in its cocked position, as indicated at A, in FIG. 6, the two fingers 18 and 20 are adjacent, or telescoped, and the surfaces 19 and 121 can be moved intermediate a pair of the adjacent abutted cans 12 moving into the apparatus of the invention. FIG. 6 shows the chain 16 in a position where one of the article separating means 17 including the finger 20 in the position A is just about ready for movement into a path that moves parallel to the flow of abutted cans through the apparatus whereby these fingers can be inserted between cans 12a and 12b in the stream of cans being fed through the apparatus. Such action will occur in the next few inches of movement of the endless chain 16 as it has moved around the means journalling it at its upstream end, as the inner course of this chain 16 then starts to move downstream parallel to the flow of the cans 13 and actually moving them through the apparatus. This same drawing also shows the finger 20 moved to its operative extended position as indicated at A', at which time the fingers 18 and 20 are in spaced relationship with each other and provide the desired longitudinal separating action between adjacent abutted articles such as the cans 12a and 12b as they are processed in the apparatus. The finger 20 maintains its position as indicated at A' until a complete circuit of the means, or chain 16 has occurred and such chain is again passing around its journal means at its upstream end. When being moved in the portion of its orbit and in the direction of the arrows indicated at 21 in FIG. 6, the finger 20 is cocked by means brought into engagement with a roller 22 which is journalled on a spur gear 23 that is in operative engagement with the movable finger 20. This spur gear 23 engages a rack 24 on a lower portion of the article separating means 17 to advance such rack 24 in a downstream direction, as the spur gear 23 is rotated. Such movement of the spur gear 23 is produced by a cam 25, FIGS. 6a and 6b, that is secured to the frame 11 for engaging the roller 22 with movement of the chain 16 in the direction 21 at this portion of its endless course of movement. The cam 25 has a varying vertical height on a cam surface 125 thereof whereby as the roller 22 on its support stud or pin moves arcuately with the spur gear 23 engaging the rack gear 24 and being rotated by the cam 25, this causes the rack gear 24 to move rapidly in a downstream direction. In position A', the roller 22 is vertically above the center of the spur gear 23. The roller 22 may be started to move by contacting the leading end of the cam 25 and terminates its drive by rotation with the spur gear 23 down to a vertical position in relatively loose engagement with the cam surface 125. The movable finger 20 is slidably positioned for controlled reciprocation in the means 17 and is suitably secured to the rack gear 24 as by a stud or pin 26 that extends from the movable finger 20 and engages the rack gear 24 to be moved therewith in relation to the article separator means 17 by which it is carried. Operative movement of the movable finger 20 is provided, as by a coil spring 27, that is received in a suitable bore 28 provided in the frame or stationary portion of the article separating means 17. Such spring 27 can be compressed axially in the bore 28 to take the position shown in FIG. 7 but with the spring being adapted to have one end thereof bear against a portion of the movable finger 20 to push it to the extended or operative position, as indicated in FIG. 8. The spring 27 may include a centering pin or guide (not shown) that controls its position. It will be realized that the plastic film 15 which has been positioned around the cans as shown in FIGS. 6 through 8 is loosely associated therewith whereby when the article separating means 17 are positioned between the sides of and engage the articles 12a and 12b, the film will be indented, or stretched slightly where the article separating means engage with laterally opposed portions of the film and rows of abutted cans. Then, when corresponding movable fingers 20 in each of the endless chains are released, the film 15 will continue to move with the cans being processed in the apparatus and relative slippage will occur between the film 15 and the adjacent cans 12 while the movable fingers 20 are retaining the following cans or articles temporarily against downstream movement in the apparatus, as the film 15 is relatively tough and strong and is then in the form of an endless enclosure band.

A cam or finger release bar or member 29, as shown in FIGS. 6 and 6b, is also provided at the downstream end of the cam 25. This cam release bar 29 has an upwardly inclined cam surface 29a provided thereon for engaging the roller 22 and gradually releasing the movable finger 20 for movement by the spring 27. By use of this cam release bar 29, if the apparatus is operated with no articles therein, still the article separating means 17 will be actuated continuously by drive of the apparatus and no damage will be done to any portions of this article separating means 17 by a snap action upon the movable finger 20. However, if articles are present, still the coil spring and cam release bar will permit relatively rapid action of the movable finger 20 to retain following articles stationary while the leading articles are being separated into a group for further processing in the apparatus.

*First heat shrink tunnel*

Figure 1:
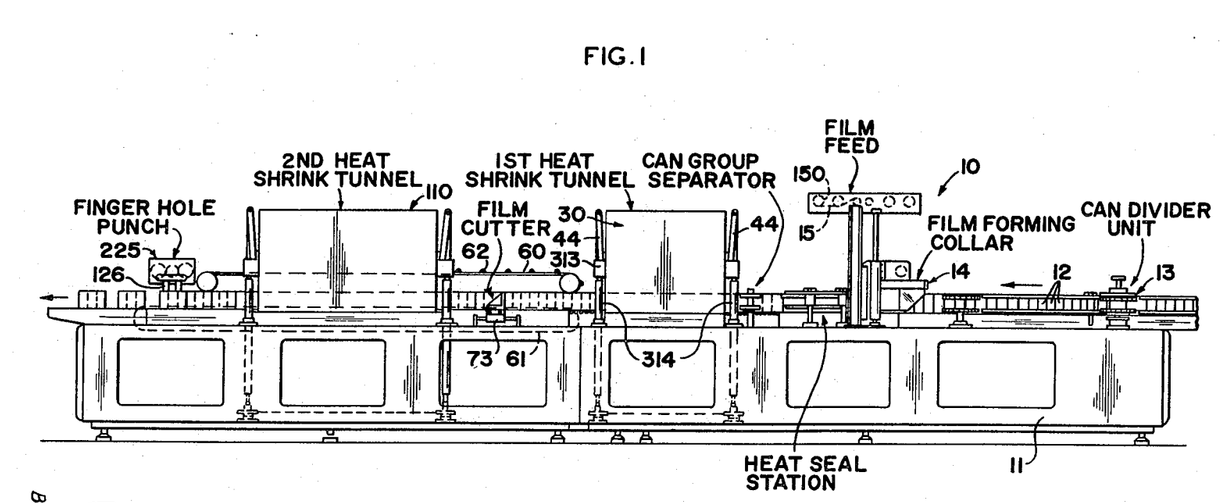
FIG. 1 is a somewhat diagrammatically shown side elevation of the apparatus of the invention.

After the articles being processed have been positioned in longitudinally spaced groups in the endless enclosure formed from the film 15, the stream of articles, with the enclosure band therearound, is moved into and through an initial shrink stage, in this instance a first heat shrink tunnel indicated as a whole by the numeral 30. The film 15 is made from any suitable plastic material, which normally is transparent and has been so processed as to be heat shrinkable usually biaxillay when exposed to temperatures, such as approximately 300 to 350° F. for just a few seconds. Usually the film used is made from polyvinyl chloride, or the like. In the tunnel 30, any suitable means may be provided for heating air received within the tunnel, and normally this tunnel 30 has spaced inner and outer walls 31 and 32. The tunnel is generally of inverted U-shape in vertical section. Usually the entire tunnel 30 is movable vertically in the apparatus and it has an operative lowered position as shown in FIG. 1. The tunnel 30, as shown, has a pair of threaded support brackets 33 secured to its positioning means or bar 133 that is secured to the tunnel and to the brackets 33 at each end of the tunnel and with such support brackets 33 being threaded on their inner surfaces and engaging with suitable members, such as threaded jack shafts or supports 34, whereby rotation of these jack shafts 34 will cause the brackets 33 and the tunnel 30 secured thereto to be elevated rapidly to an inoperative position, when desired. That is, when the movement of articles through the apparatus 10 is temporarily terminated, or at any other time, the tunnel 30 can be raised or lowered by proper drive of the support rods or shafts 34. Further details of one typical type of a heat shrink tunnel are shown more clearly in Bruce G. Copping co-pending application Ser. No. 465,613, filed June 21, 1965, now Patent No. 3,381,443.

Figures 5, 5A:
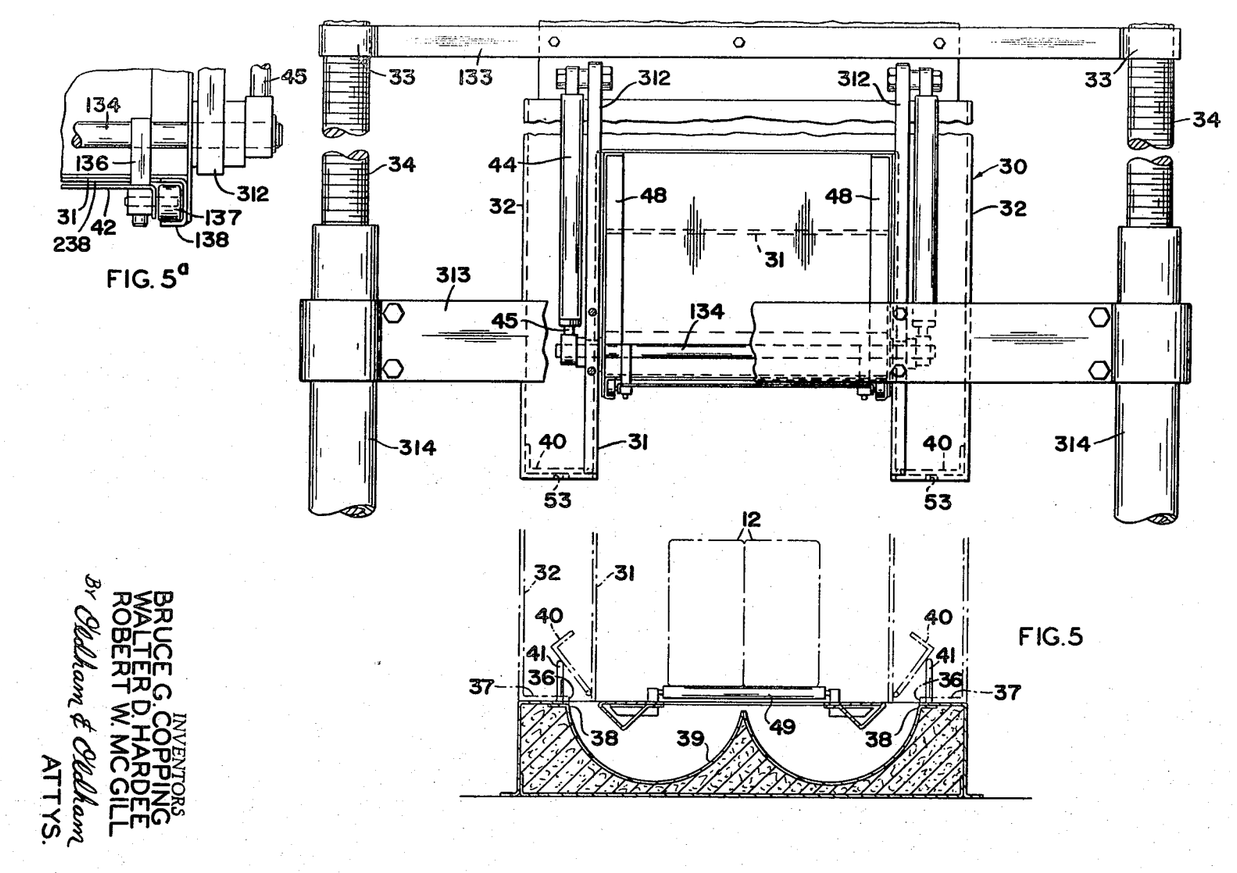
FIG. 5 is an end elevation, partly in section, of a heat shrink tunnel of the apparatus of the invention and the associated portion of the apparatus frame.
FIG. 5a is a fragmentary, enlarged end elevation of a portion of the heat shrunk tunnel of FIG. 5 to clarify the arrangement of a portion of the elements thereof.

As indicated, any suitable means can be associated with the first heat shrink tunnel 30 for heating air received between the inner and outer walls thereof and other suitable means (not shown) can be provided for circulating air in the tunnel so that air will flow from the tunnel through a plurality of apertures 35 formed in the inner wall 31 thereof at only the top portion thereof whereby air will flow therefrom down and around the assembly of the cans 12 and film 15 being processed in the apparatus. Or, heated air may be supplied to the tunnels for circulation therein. A plurality of apertures, slots, or holes 36 are provided in a bottom wall 37 that connects to and extends between the lower ends of the inner and outer walls 31 and 32, respectively, of the tunnel. Normally the frame 11 at the first heat shrink tunnel 30 provides suitable openings or apertures 38 in an upper portion thereof whereby air can flow down from the tunnel 30 into a plenum or chamber 39 formed at the portion of the frame 11 below the tunnel 30 whereby heated air from the tunnel can be circulated down, around and be vented upwardly adjacent the bottom and side portions of the articles moving through the tunnel 30. While engaged with the article separating means 17 and being moved downstream thereby, the cans 12 preferably are supported on a roller assembly or conveyor 49, FIG. 5. Usually a longitudinally extending flap 40 is carried within the tunnel 30 adjacent the lower margin of each side thereof and such flaps 40 are pivotally positioned in the tunnel and are shaped so that the flaps 40 normally will fall over and cover the apertures 36 in the bottom walls 37 of the tunnel. However, when the tunnel is moved down to operative position, studs or fingers 41 on the frame adjacent each other lower margin of the tunnel will extend through apertures 53 and engage the flaps 40 carried by the tunnel to raise them to expose the apertures 36 for passage of heated air therethrough.

Figure 3:
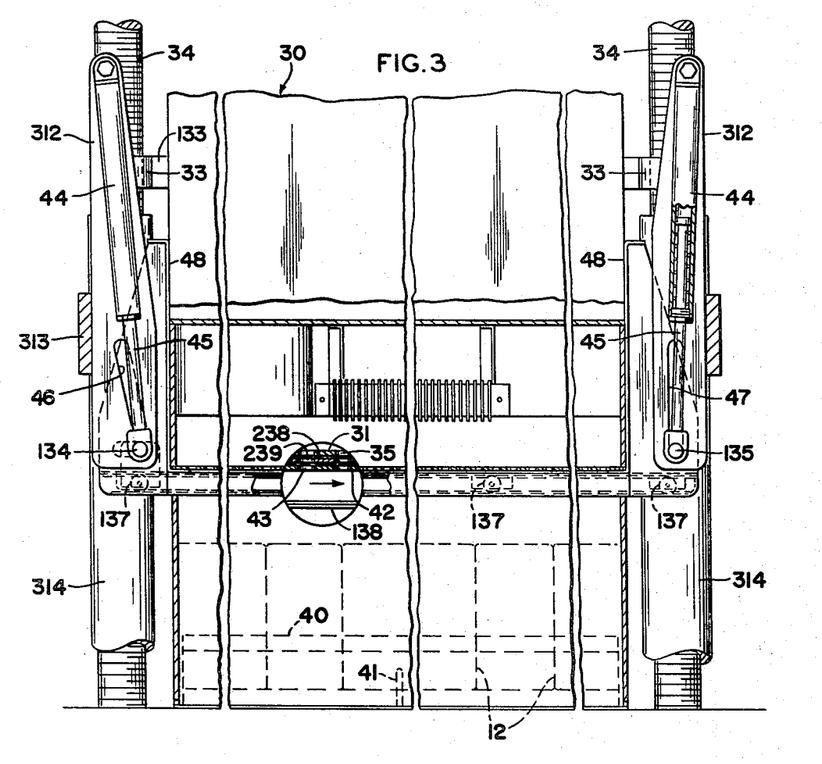
FIG. 3 is a longitudinal vertical section of a heat shrink tunnel of the apparatus of the invention in operative position.
Figure 4:
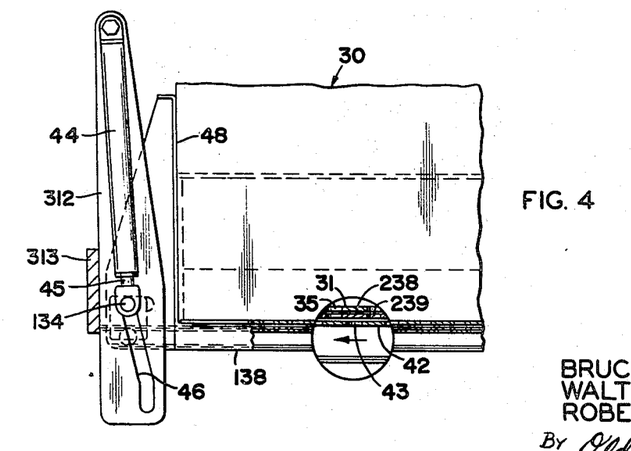
FIG. 4 is a fragmentary enlarged vertical section of the apparatus shown in FIG. 3, but wherein the apparatus is shown in its inoperative condition.

In order to maintain the tunnel 30 in immediate operative condition and to prevent excessive heating, melting or burning of the plastic film received within the tunnel should the flow of the film and articles through the tunnel be suspended, the tunnel 30 is raised by the means referred to hereinbefore to move it out of association with the film. Preferably means are provided in the tunnel for closing the apertures 35 at such time to prevent air flow therefrom. In this instance, a plate 42 is carried by the tunnel 30 in movable relation thereto and such plate 42 has a plurality of apertures 43 therein that can be positioned in alignment with and immediately below the apertures 35 in the inner wall 31 at its upper surface. Hence, when the tunnel is operatively positioned, FIG. 3, the plate 42 has its apertures 43 aligned with the apertures 35 but when the tunnel is elevated, suitable control means are provided for moving the plate 42 longitudinally a short distance to move the apertures 43 out of alignment with the apertures 35 and hence prevent any appreciable air flow from the tunnel. The tunnel positioning means also includes end plates 48 that engage the open ends of the tunnel 30 when it is elevated to close or seal the open ends thereof. Thus, the heated air within the tunnel can be retained therein and be maintained at fully operative temperatures so that the tunnel will be ready for operation instantaneously with its lowering into full operative engagement with the associated portion of the apparatus 10. Such respective longitudinal movement of the plate 42 is provided by means, such as a plurality of positioning cylinders or air checks 44 which have piston rods 45 extending therefrom. These air checks 44 are pivotally positioned at their upper ends at a fixed location whereby the piston rods 45 are actuated when the tunnel 30 is raised or lowered. The piston rods 45 are in their extended positions when the tunnel is operatively positioned. The upper end of each of the air checks 44 is pivotally secured to individual upwardly extending arms 312 carried by frame bars 313 secured to and extending between sleeves 314. The sleeves 314, receiving the shafts 34 therein, are mounted on the frame 11 and extend upwardly therefrom. The lower ends of the piston rods 45 operatively connect to the plate 42 which extends the width of the inner portion of the tunnel, by transversely extending rods 134 and 135 that extend through slots 46 and 47 in portions of the arms 312. These slots 46 and 47 are used to control the position of the plate 42 upon movement of the tunnel. FIG. 3 shows that the slots 46 are inclined at an angle to the vertical and hence will cause the plate 42 to be moved slightly in an axial direction with vertical movement of the tunnel and retraction of the piston rods. The other slot 47 extends in a vertical direction as the desired movement of the plate 42 into and out of registry with the top portion of the inner wall can be controlled through the slots 46 in corresponding lateral positions in the apparatus and engaging the plate 42 to provide the desired sealing movement when the tunnel is to be inoperatively positioned. The rod 134, FIG. 5a, has short rods 136 extending downwardly therefrom adjacent each lateral margin of the tunnel 30. The rods 136 engage the plate 42 and roller means 137 that slidably support the plate on guides 138 formed at the lateral margins of a plate 238 operatively positioned in and extending axially of the tunnel. The plate 238 has apertures 239 therein in register with the apertures 35 in the tunnel wall. Hence, with longitudinal movement of the rod by the slots 46, the plate 42 will be moved to close the apertures 239 and the tunnel may move vertically up to space its inner wall top from the plate 42.

Figure 2:
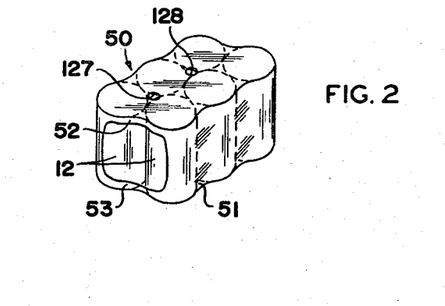
FIG. 2 is a perspective view of an article assembly made by the apparatus of the invention.

As the cans 12 and the enclosure collar of film move through the heat shrink tunnel 30, the plastic film is brought into relatively good engagement with the tops, bottoms and side portions of the articles received within the film, but final bonded engagement of the continuous film with the articles is not as yet effected. A package 50 as provided by the apparatus of the invention is shown in FIG. 2. This package 50 includes any suitable number of articles, in this instance six of the cans 12, which are received within an enclosure band 51 formed from the plastic film 15. This band 51 is characterized by the fact that end portions of the band, as indicated at 52 and 53, have initially protruded axially beyond the end cans in the package 50 and, with a final heat shrink action that is performed on the film after it has been separated into longitudinally spaced sections used in forming the individual bands 51, then the end portions 52 and 53 are shrunk into snug engagement with opposed top and bottom portions of the end cans in the package.

As previously explained, the articles being processed are divided into a number of uniformly spaced groups as the articles are moved through the apparatus 10 and, as a feature of the invention, this longitudinal spacing between the groups of articles is used to provide the extra axial lengths in the enclosure film surrounding the articles whereby the end portions 52 and 53 can ultimately be provided on these groups of articles being processed.

*Second endless article engaging means*

Figures 9, 11:
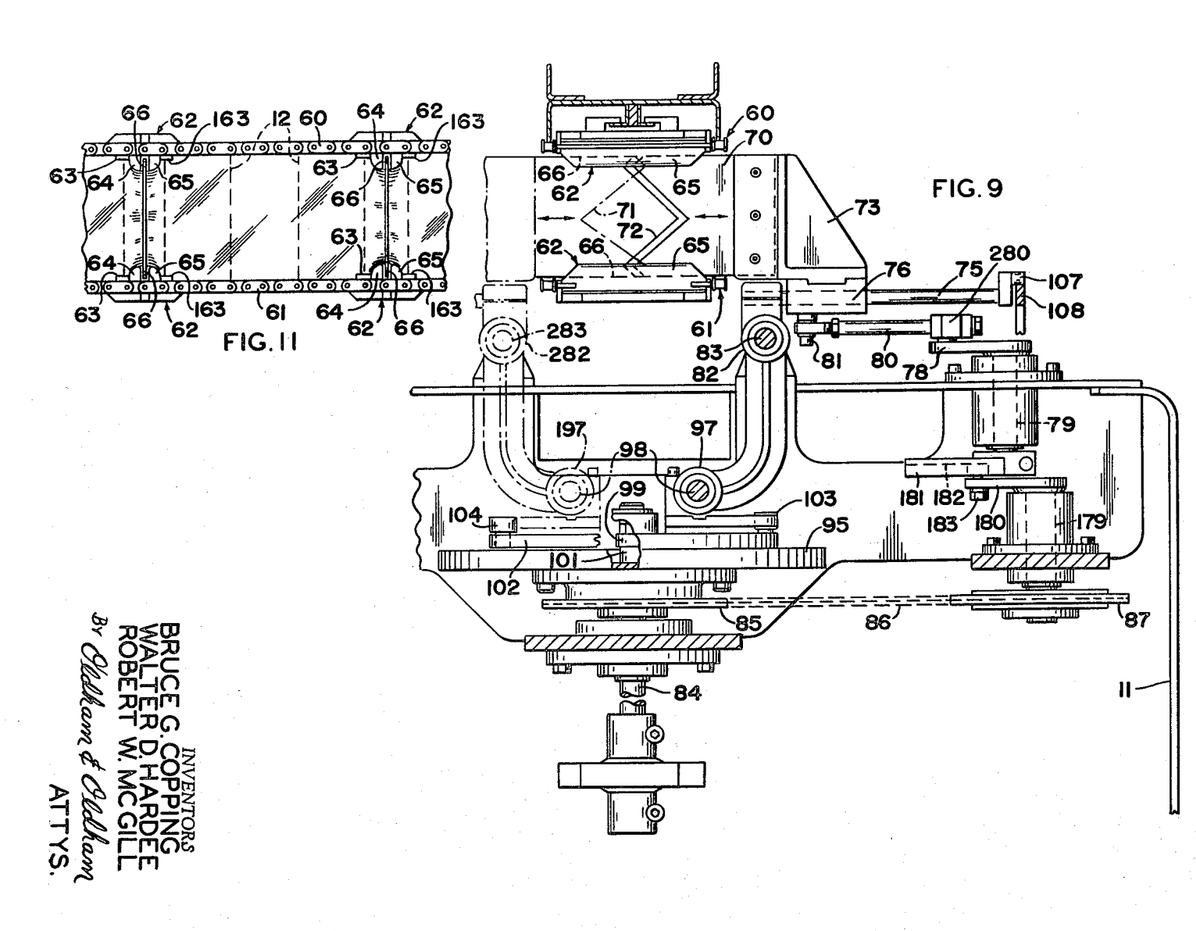
FIG. 9 is a fragmentary vertical section, partly broken away, of a portion of the plastic film cutting means and associated drive means.
FIG. 11 is a fragmentary side elevation of just the article engaging means immediately following the flying shear station as shown in FIGS. 9 and 10.

To process the articles, such as cans 12, further in the apparatus 10, a pair of endless bands or chains 60 and 61, FIGS. 1 and 9, are suitably journalled in the apparatus so that each of these chains 60 and 61 has a course extending longitudinally of the apparatus 10 and moving in a direction downstream of the apparatus. One of these courses from each of the chains 60 and 61 is positioned immediately adjacent a vertical margin of the articles being processed whereby opposed members on the chains 60 and 61 can be provided at longitudinally spaced portions thereof to engage the groups of articles being processed and move them as groups positively longitudinally of the apparatus. These chains 60 and 61 and associated means are best shown in FIGS. 1, 9 and 11 of the drawings, and each of the chains has suitably operatively secured thereto a number of article engaging means 62. Each of these article engaging means 62 includes, for example, a pair of article engaging blocks 63 and 163 so that in all events, a pair of vertically inwardly extending fingers or lugs 64 and 65 are provided on each of the article engaging means 62 with those lugs 64 and 65 each extending transversely of the apparatus over substantially the entire width of the stream of articles being processed. A slot 66 is provided between adjacent surfaces of these lugs 64 and 65 which slots 66 also extend transversely of the stream of article flow through the apparatus. These lugs 64 and 65 normally are made from a heat resistant, resilient material such as foamed silicone, and include foot sections that are adapted to engage with an upper or a lower edge portion of an adjacent one of the cans 12 and force the film thereagainst. The lugs 64 and 65 extend downwardly or vertically of the articles being processed so as to engage and indent or stretch the continuous film 15 slightly between the groups of articles. Such lugs 64 and 65 have smoothly contoured exposed surfaces for forcing the continuous plastic film arcuately inwardly. This further aids in providing an axially extending section of plastic film that protrudes beyond both ends of the groups of articles being processed by the apparatus.

*Flying shear cutting means*

Figure 10:
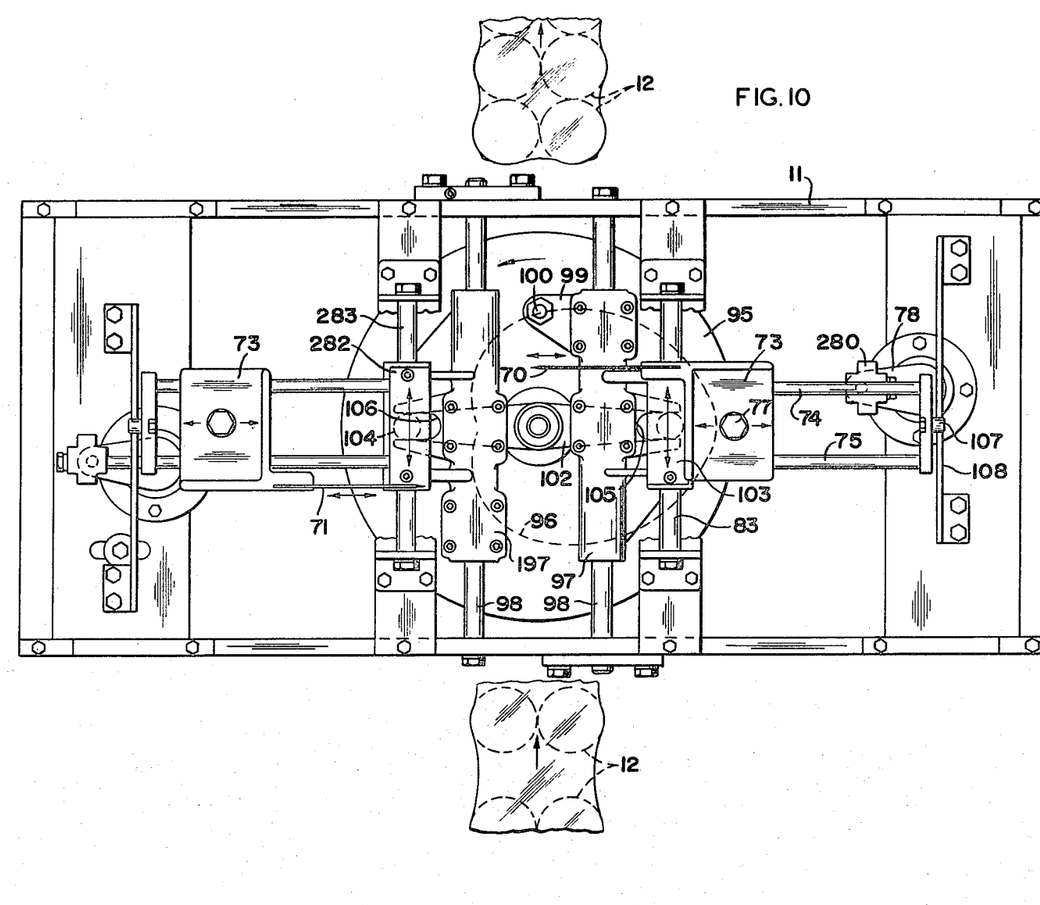
FIG. 10 is a plan view of just the flying shear film cutting means, as shown in FIG. 9, for severing the plastic film into longitudinally spaced sections of film.

The apparatus for severing the continuous plastic film enclosure 15 into individual sections for forming the bands 51 around the packages 50 is best shown in FIGS. 10 and 11. In this instance, a pair of cutter knives or plates 70 and 71 are positioned in transversely opposed but parallel, longitudinally spaced relationship to each other. These cutter plates 70 and 71, as indicated in FIG. 10, are positioned in vertical planes, and are so spaced that the cutter plate 71 is adapted to be positioned intermediate the trailing end of one group of articles and its following group in the apparatus and with the other cutter plate 70 engaging the band from its opposite margin at the leading end of the same group of articles. Each cutter plate 70 and 71 is so positioned as to exert a transverse cutting action on the continuous band of plastic film so as to cut more than half of such fium in a direction transversely to the apparatus. Each cutter plate may have a modified W-shaped, or similar, projection formed on or as its cutting edge as at 72, and these projections will overlap in their operative positions for rapid, smooth, and full cutting of the film transversely by the two cutting actions exerted on the film band.

FIG. 9 primarily shows the operative means associated with the cutter plate 70 (the cutter plate 71 being similarly positioned) and in this instance, it is seen that the cutter plate 70 is positioned on a vertically extending bracket 73 with such bracket 73 being carried by a pair of transversely extending parallel guide or slide bars 74 and 75. A bottom plate or lock plate 76 is secured to the bracket 73 as by a bolt 77 to form a slide with the bracket 73, which slide is engaged with the bars 74 and 75 for movement parallel thereto. Reciprocating movement of the slide mounting for the bracket 73 is provided as by means of a crank 78 that is secured to a driven shaft 79 suitably journalled on the frame 11. The crank 78 has a connecting arm or pitman 80 secured thereto by means 280, which connecting arm in turn is rotatably secured to a stud 81 secured to and extending downwardly from the bottom plate 76 forming a part of the slide mounting for the bracket 73. The means 280 preferably are of a pressure release type so that if a cutter strikes an article, the means 280 will slide on the pitman 80.

In order to obtain a very rapid cutting action for the cutter plates to move them into and out of engagement with the plastic film band enclosing a stream of articles as they move along the frame of the apparatus, the drive shaft 79 is itself operatively secured to a second crank means whereby the action of the crank 78 is multiplied and a full reciprocating movement of the cutter plate 70, for example, is provided with a relatively small arcuate rotation of the drive means provided. Thus, a second driven shaft 179 is suitably journalled on the frame 11 below and adjacent the shaft 79, but spaced laterally outwardly of the frame a short distance. Such shaft 179 in turn has a crank or arm 180 secured thereto and extending substantially horizontally of the apparatus. Another crank 181 with a radially extending slot 182 provided therein is connected to the lower end of the shaft 79 in order to drive it in a special manner at a high rate of speed for a portion of its rotary movement. The crank 181 is secured to the crank 180 by a roller connector 183 secured to and extending upwardly from the crank 180. This connector engages the slot 182. By these multiple crank means, a relatively short arcuate movement such as 160° of the shaft 179 will provide very rapid movement of the crank 78 connected to the shaft 79 through an arc of, for example, 200 to 250° for cutting action by the cutter 70. Hence, as the flying shear type of cutter means are moved in the apparatus of the invention, as described hereinafter in more detail, the multiple crank means connecting to each of the cutter plates will provide an effective, positive, but quite rapid reciprocating action thereof for the cutting action in the limited time available while the flying shear is moving longitudinally with the article groups. From the foregoing, it is seen that, on rotation of the shaft 79, the crank 78 through the connecting rod or arm 80 will cause this cutter plate 70 to be moved transversely into and out of cutting engagement with the enclosure band surrounding the articles being processed.

In order to provide for longitudinal movement of the entire means positioning the cutter plates in the assembly, so that these cutter plates will be brought into full cutting engagement with the moving plastic film intermediate each of the groups of articles formed therein, sleeves 82 and 282 are provided in slidable engagement with longitudinally extending rods 83 and 283 positioned on a part of the frame 11 below the lower one of the chains 61. As the flying shear means on both sides of the apparatus are substantially duplicates, only one of such members is described in detail.

Power is supplied to the apparatus 10 of the invention in any desired manner and usually one drive motor (not shown) is provided for controlling the entire apparatus and its operation. Several different power take-off shafts normally are provided in the apparatus, and FIG. 9 shows that a vertically extending driven shaft 84 is provided below the cutter means used in the apparatus and such driven shaft 84, for example, has a sprocket 85 secured thereto that engages a connector chain 86 which extends over to and engages and drives a sprocket 87 on the shaft 179. A cam plate 95 is secured operatively to the upper end of this drive shaft 84 and is positioned in a horizontal plane underneath the flying shear cutting station or portion of the apparatus of the invention. This cam plate 95 has a cam groove diagrammatically indicated at 96 formed in its upper surface. Longitudinal reciprocating movement of the sleeve 82, for example, is controlled by means of a similar sleeve 97 parallel that is preferably formed as a unit with the sleeve 82 so that this integral member or casting is supported at two parallel bores provided therein. Such sleeve 97 is shown slidably engaged with one of two parallel rods or bars 98 positioned below the flying shear cutting station. The sleeve 97 or casting has a laterally inwardly offset bracket or section 99 provided thereon or secured thereto which bracket section 99 has a vertically extending stud shaft or pin 100 secured thereto. A cam follower or roller 101 is secured to the pin 100 to extend down into the cam groove 96 provided in the cam plate whereby upon rotation of the cam plate 95, the sleeve 97 and its associated sleeve 82 will then be reciprocated on the rods 83 and 98 with which they are engaged. It should be noted that the guide or slide bars 74 and 75 are secured at their inner ends to the sleeve 82 for movement therewith. The outer ends of such slide bars are secured together and have a roller 107 journalled thereon. The roller engages a guide bar 108 on the frame 11 to be supported thereby. Hence, the brackets 73, to which the cutter plates are attached, are provided with a reciprocating longitudinal movement parallel to the axis of movement of articles into and through the apparatus of the invention. Obviously, the cam plate 95 and cam groove 96 are so designed in relation to the drive of the apparatus that the reciprocating movement for the sleeve 97, sleeve 83 and associated means all occur in proper timed relationship to the flow of the longitudinally spaced groups of articles into and through the apparatus.

So as to provide for controlled reciprocating movement of the member or assembly on which the cutter plate 71 is mounted with the articles being packaged, a rocker arm 102 is also journalled on the upper end of the driven shaft 84. The rocker arm 102 positions an upwardly extending roller member 103 and 104 at each end thereof and which rollers are in turn adapted to engage with a laterally outwardly open slot 105 provided on the assembly of the sleeve 97 or on a companion slot 106, respectively, provided in a laterally outwardly extending portion on the assembly or casting provided with or formed on a sleeve 197 that is associated with the positioning means for the cutter plate 71. These rollers 103 and 104 on the rocker arm 102 remain in engagement with their respective slots in the associated flying shear cutting means at all times whereby with rotation of the cam plate 95 and the thus provided reciprocating movement for the assembly of the sleeve 82 and the cutter positioning bracket carried thereby, this reciprocating movement is then transmitted to the other cutting means associated with the sleeve 282 and its associated bracket and cutting members.

*Second heat shrink tunnel*

A second heat shrink tunnel 110 is shown located downstream from the film cutters or cutter plates 70 and 71 whereby after the film has been severed into individual bands, and such bands are retained tightly in engagement with the associated cans enclosed thereby by the article engaging means 62 on the chains 60 and 61, but with the end portions of the individual plastic film bands being free for movement inwardly in a vertical direction of the articles being packaged, then the chains 60 and 61 carry the packages being produced into and through such second heat shrink tunnel 110. In this tunnel, which is constructed substantially the same as the first heat shrink tunnel 30, but which may be longer, the plastic film is heated to a proper temperature and the articles remain in the tunnel for a sufficient length of time that the plastic film bands and the end portions thereof are brought into tight or positive engagement with the articles enclosed therein whereby a very strong, unitary package 50 can be provided.

Beyond the downstream ends of the chains 60 and 61 preferably a finger hole punch means 225 is provided. This finger hole punch means may be of any suitable construction and it is adapted to drive a punch 126 through a cyclic limited vertical movement whereby the punch 126 will form a pair of finger and/or thumb receiving openings 127 and 128 in the upper surface of the band 51 enclosing an individual package 50. Hence, one can conveniently pick up or grasp the package 50 for transport.

From the foregoing, it will be seen that the apparatus of the invention can be used for forming large numbers of articles into desired packages 50 and with the individual packages including any suitable number of packaged articles which are tightly received and retained in a unitary assembly by the individual enclosure bands 51 around each of the packages 50. The apparatus is adapted to function at high speed and all portions of the apparatus are driven in timed relationship to each other whereby a large number of longitudinally spaced groups of articles will be processed simultaneously in the apparatus. Naturally, if articles of different heights and/or diameters are to be packaged in the apparatus, obviously then it is necessary to replace the endless chains 16 and 16a and/or the chains 60 and 61 with equivalent members which have article engaging or separating means provided on proper portions thereof for engaging the groups of articles, or the articles being processed for dividing them into groups and for retaining the plastic film enclosure band in proper association with the articles being processed. Any suitable guides are provided in the apparatus, as required, as for the endless chains 16, 16a, 60 and 61.

Normally the continuous plastic film from the roll or supply of film used in association with the apparatus will be drawn therefrom and processed in the film forming collar to be folded continuously into the desired band to surround the articles being processed and with such film being engaged, as by the chains 16 and 16a and means thereon, to be pulled through the collar means 14 and into the apparatus at a uniform rate with flow of articles into and through the apparatus.

To simplify some of the drawings, the enclosure film 15 has been omitted therein. It also should be noted that the inner walls of the tunnels may be spaced any suitable distance from the outer walls and that these walls are suitably insulated. Air may be supplied to, or pulled into, the tunnels in any desired manner.

The articles being packaged can be supplied to the film forming collar means 14 in any known manner to be enclosed in the continuous tube or band of film provided.

While one complete embodiment of the invention has been disclosed herein, it will be appreciated that modification of this particular embodiment of the invention may be resorted to without departing from the scope of the invention as defined in the appended claims.

What is claimed is.

1. Apparatus for forming packages of abutted articles by a plastic heat shrunk film where the apparatus includes a frame, means for feeding a row of abutted articles into the apparatus, means for forming a loose enclosure band of plastic film around such abutted articles and wherein the articles and enclosure band can move as a continuous assembly along a fixed path in the apparatus, which is characterized by a pair of driven endless means journalled on said frame to have an operative course of movement along a first portion of said fixed path at each of the lateral margins thereof and in horizontal alignment with said articles, separating means operatively secured to each of said endless means at uniformly longitudinally spaced portions thereof and extending laterally inwardly of the apparatus to engage a pair of adjacent abutted ones of said articles and to separate such articles into longitudinally spaced groups of articles, a heat shrink means through which the spaced groups of articles and the continuous band of film move, and driven flying shear cutting means carried by said frame for severing the band of film into individual bands associated with each of the groups of articles.

2. Apparatus for forming packages of abutted articles as in claim 1 where said separating means each include a finger member movable in relation to the remainder of such separating means and being movable in an upstream direction with relation to its positioning endless means when engaging the abutted articles to separate them into longitudinally spaced groups.

3. Apparatus as in claim 2 where spring means are present in said separator means and constantly urge said finger member to an extended upstream position in relation to a fixed article engaging portion of said separator means, and cooperating means are provided on said frame and said separator means to cock said finger member by moving it to a retracted position at the upstream end of said endless means prior to its operative course of movement and engagement of any article by said separator means.

4. Apparatus as in claim 2 where said separator means each include a fixed member movable with said separator means to engage a leading article and move it downstream and said movable member engages the following article, and cooperating means are provided on said separator means and said frame to move said movable members to a position adjacent said fixed member at the upstream end of said endless means.

5. Apparatus as in claim 4 where a second pair of driven endless means are journalled on and positioned in said frame so that each has a course immediately adjacent a different vertical margin of said articles after they have passed said heat shrink means, and uniformly longitudinally spaced engaging means are secured to said second pair of endless means in vertically opposed relation to engage opposed top and bottom portions of said articles and the film thereon and move them along a part of said fixed path, said engaging means having transversely extending slots formed therein for receiving and guiding cutter bars of said flying shear cutting means.

6. Apparatus as in claim 4 where said cooperating means include cam means carried by said frame at the upstream end of said endless means, a gear journalled on said separator means, a cam follower secured to said gear for engaging said cam means to rotate said gear, and a rack gear slidably carried by said separator means and engaging said gear, said rack gear operatively engaging said movable member to control the position thereof and move it to a retracted position as each of said separator means is moved around the upstream end of its course of movement.

7. Apparatus as in claim 1 wherein said flying shear cutting means include a pair of carriage means each slidably positioned adjacent a lateral margin of the fixed path in the apparatus for movement parallel thereto, drive means for reciprocating said carriage means operatively connected thereto, a vertically positioned cutter bar associated with each of said carriage means, slide means mounting each cutter bar on a said carriage means for movement perpendicular to said fixed path and from a position out of said fixed path to a position over one half way through said fixed path, and crank type drive means connecting to each of said slide means to move it and its associated cutter bar reciprocably.

8. Apparatus as in claim 7 where said drive means for said carriage comprise a driven rotary cam means, a cam follower operatively carried by one of said carriage means and engaging said cam means to be reciprocated thereby, and rocker arm means journalled on said frame operatively connecting said carriage means together whereby both of said carriage means are reciprocated but are moved in opposite relation.

9. Apparatus as in claim 7 where said crank type drive means each include a driven vertically positioned shaft positioned beyond a lateral margin of said fixed path, a crank arm secured to said shaft, a second vertical shaft positioned laterally inwardly of said driven shaft, a slotted crank arm secured to the lower end of said second shaft and operatively engaging said first crank arm for drive thereby, and a third crank arm operatively connecting said second shaft to said slide means for rapid controlled reciprocation thereof.

10. Apparatus for forming packages of abutted articles by a plastic heat shrunk film where the apparatus includes a frame means for feeding a row of abutted articles into the apparatus, means for forming a loose enclosure band of plastic film around such abutted articles and wherein the articles and enclosure band can move as a continuous assembly along a fixed path in the apparatus, which is characterized by a pair of driven endless means journalled on said frame to have an operative course of movement along a first portion of said fixed path at each of the lateral margins thereof and in horizontal alignment with said articles, and separating means operatively secured to each of said endless means at uniformly longitudinally spaced portions thereof and extending laterally inwardly of the apparatus to engage a pair of adjacent abutted ones of said articles and to separate such articles into longitudinally spaced groups of articles, said separating means each including a finger movable in an upstream direction with relation to its endless means.

11. Apparatus as in claim 10 where spring means are present in said separating means and constantly urge said finger member to an extended upstream position in relation to a fixed article engaging portion of said separating means, and cooperating means are provided on said frame and said separating means to cock said finger member by moving it to a retracted position at the upstream end of said endless means prior to its operative course of movement and engagement of any article by said separating means.

12. Apparatus as in claim 10 where a driven flying shear cutting means, including a cutter member, is provided adjacent each lateral margin of said fixed path, said cutter members being positioned in vertical planes and having laterally inner cutting edges with sharp projections thereon, which cutting edges are of greater vertical height than said enclosure band for cutting the plastic film band from opposed lateral margins thereof.

13. Apparatus as in claim 10 wherein a second pair of endless means are provided with horizontal courses of movement at the vertical margins of the articles processed, and transversely extending engaging means are carried on said second endless means to engage end articles in the groups of articles being processed, said last-named means having curved inwardly extending surfaces engaging the continuous band of film to force it inwardly between the groups of articles being processed, said last-named means being formed from resilient, heat-resistant material.

References Cited

UNITED STATES PATENTS

| | | | |
|---|---|---|---|
| 3,190,434 | 6/1965 | Dardaine | 198—34 |
| 3,239,991 | 3/1966 | Copping | 53—30 |
| 3,303,630 | 2/1967 | Harm | 53—28 |
| 3,367,086 | 2/1968 | Ganz | 53—48 |

TRAVIS S. McGEHEE, *Primary Examiner.*

R. L. SPRUILL, *Assistant Examiner.*

U.S. Cl. X.R.

53—30; 198—34